United States Patent
Poe et al.

(10) Patent No.: US 10,295,105 B2
(45) Date of Patent: May 21, 2019

(54) FLUIDIC PIG LAUNCHER AND METHOD OF ITS USE

(71) Applicant: TDW Delaware, Inc., Wilmington, DE (US)

(72) Inventors: Roger Poe, Beggs, OK (US); Woody Ray Smith, Stillwater, OK (US); Joshua D. Mitchell, Broken Arrow, OK (US)

(73) Assignee: TDW Delaware, Inc., Wilmington, DE (US)

( * ) Notice: Subject to any disclaimer, the term of this patent is extended or adjusted under 35 U.S.C. 154(b) by 109 days.

(21) Appl. No.: 15/185,140

(22) Filed: Jun. 17, 2016

(65) Prior Publication Data
US 2016/0369930 A1  Dec. 22, 2016

Related U.S. Application Data

(60) Provisional application No. 62/180,873, filed on Jun. 17, 2015.

(51) Int. Cl.
*B08B 9/027* (2006.01)
*B08B 9/00* (2006.01)
*F16L 55/46* (2006.01)
*B08B 9/055* (2006.01)

(52) U.S. Cl.
CPC .............. *F16L 55/46* (2013.01); *B08B 9/055* (2013.01)

(58) Field of Classification Search
CPC ....... F16L 55/46; F16L 55/38; F16L 2101/12; Y10T 137/0435; B08B 9/055; B08B 9/0551; B08B 9/0325

USPC .............. 134/8, 18, 22.11; 15/104.062, 3.5, 15/104.061, 104.063
See application file for complete search history.

(56) References Cited

U.S. PATENT DOCUMENTS

| 3,266,076 | A | * | 8/1966 | Surber | F16L 55/46 137/268 |
|---|---|---|---|---|---|
| 3,978,708 | A | | 9/1976 | Hayward | |
| 4,237,921 | A | | 12/1980 | Hayward | |
| 5,139,576 | A | * | 8/1992 | Davis | F16L 55/46 134/18 |
| 5,927,319 | A | * | 7/1999 | Burkhalter | B08B 9/055 137/268 |
| 2009/0083922 | A1 | * | 4/2009 | Watson | F16L 55/46 15/104.062 |

(Continued)

*Primary Examiner* — Nadine G Norton
*Assistant Examiner* — Christopher Remavege
(74) *Attorney, Agent, or Firm* — Gable Gotwals (57) ABSTRACT

A pig launcher/receiver includes a fluid distribution grid arranged above a floor of the pig launcher/receiver's barrel to define a fluid chamber between the floor and the fluid distribution grid. The distribution grid has a plurality of ports arranged to form jets that discharge at least a portion of the fluid which enters the fluid chamber. A predetermined number of the ports are inclined relative to vertical and in a direction opposite a closure door of the barrel. The fluid distribution grid, which is preferably semi-circular shaped, can be a permanent weldment, bolted on, or removable. When used in launching a pig, the ports provide a differential pressure that lifts the pig and overcomes friction as the pig moves forward. Because a number of the ports are blocked by the sealing elements (cup or disc) of the pipeline pig, the number of pigs residing in the launcher/receiver can be determined.

9 Claims, 5 Drawing Sheets

(56) References Cited

U.S. PATENT DOCUMENTS

2012/0131758 A1* 5/2012 Bacon .................. F16L 55/38
15/104.062

* cited by examiner

FLUIDIC PIG LAUNCHER AND METHOD OF ITS USE

CROSS-REFERENCE TO RELATED APPLICATIONS

This application is a conversion application which claims priority to U.S. Provisional No. 62/180,873 filed Jun. 17, 2015, which is incorporated herein by reference.

BACKGROUND OF THE INVENTION

This invention relates to launchers used to launch a pipeline pig or a diagnostic tool into a pipeline system. The primary purpose of a pig launcher is to launch the pig or tool into the pipeline system without interruption of the flow through that system. Pig launching (and receiving) systems vary from one to another depending on specific purpose and product. Variations include such things as placement of valves, automated mechanisms, length of the launch tube or barrel, type of closure door, and the means to move a pig into the reduced cross-section area of the barrel (e.g. gravity, screws).

Regardless of those variations, all launchers (and receivers) include the barrel, which holds one or more pigs, and a large branch connection which connects the barrel to the pipeline system. When ready to launch a pig into the pipeline system, a Tee section diverts pipeline fluid flow into the end of the barrel, behind one or more of the pigs positioned in the barrel. Because this fluid flows unabated into the barrel, it loses momentum and drops in pressure to the pressure of the barrel without doing immediate work. The fluid from this flow could be used much more aggressively to do immediate work towards launching the pig.

SUMMARY OF THE INVENTION

A fluidic pig launcher made according to this invention makes use of a distribution grid arranged above a lower floor portion of the barrel so that the distribution grid positions the fluid entering the barrel in such a way that the fluid immediately interacts with a pig or diagnostic tool lined up in the barrel to lift the pig or tool and negate the effects of friction. Reducing friction significantly increases the ease at which a pig can be launched; it also eliminates the chances of miss-launched pigs due to drag on the pig or ice formations. The distribution grid preferably is a perforated sheet having a plurality of ports, some of which are angled in the launch direction, that create fluid jets (and therefore a differential pressure) which lift the pig vertically away from the floor and axially moves the pig into the launch direction. This arrangement permits even a horizontal launcher to move a pig forward and into the pipeline with only pressure and momentum.

The fluidic launch approach can be used in pig receivers as well to reduce the speed of entering pigs and, therefore, reduce or eliminate potential damage of equipment as the pig enters the receiver barrel. Jets directed axially in the direction of the pig as it enters the receiver apply a force against the incoming pig that slow the pig and cushion the pig as it hits the closure door at the end of the pipeline or point at which the pig is removed. This approach can be reversed to allow a pig to run in either direction to allow for bi-directional applications. The launcher launches the pig in a first direction toward the receiver and the receiver, after receiving the pig, launches the pig in a second (opposite) direction toward the launcher, which then acts as the receiver.

Use of this system also allows a technician or PLC to mathematically indicate whether a given pig has been launched successfully. When multiple pigs are loaded into a given launcher, each pig can be accounted for as a function of pressure within the launcher as the fluidic launch system is energized. Safety is also increased because the closure does not need to be opened to determine whether pigs have been launched as needed. Pressure variations within the system will clearly indicate the number of pigs remaining inside the launcher or receiver system, allowing for complete accountability of all assemblies placed in any given launcher.

The fluidic launch system also minimizes, if not negates, the potential for hydrates or ice formations within the barrel of the launcher. The velocity and distribution of jets serve to break-up ice as the ice begins to form on the distribution matrix floor, alleviating the potential for large accumulations of hydrates or ice to become an impediment. This also ensures that a given pig body does not freeze to the floor of the launcher barrel and create a failed launch. The pressure applied to a pig by the jets can be sufficient to break the pig loose and allow it to be placed into the launch position.

In a preferred embodiment, the pig launcher/receiver includes a fluid distribution grid arranged above a floor of the pig launcher/receiver's barrel to define a fluid chamber between the floor and the fluid distribution grid. The fluid distribution grid has a plurality of ports arranged to form jets that discharge at least a portion of the fluid which enters the fluid chamber. A predetermined number of the ports are inclined relative to vertical and in a direction opposite a closure door of the barrel. The fluid distribution grid, which is preferably semi-circular shaped, can be a permanent weldment or removable. The grid can also be energized in sections to preferentially launch the next pig in line. This section-by-section arrangement can alleviate the need for expensive control pins and hydraulic power units.

When used in launching, the ports provide a differential pressure that lifts the pig and overcomes friction as the pig moves forward. A number of the ports are blocked by a sealing element (cup or disc) of the pipeline pig and another number of the ports are unblocked when the pipeline pig is resting on the fluid distribution grid.

A preferred embodiment of a method of launching/receiving a pipeline pig includes the steps filling a fluid chamber located between a floor of a barrel of the launcher/receiver and the fluid distribution grid. The method can also include the step of calculating, based on the back pressure at a given flow rate (before the pig or pigs lift), the number of blocked ports and area covering a range of or containing the blocked ports. The area is then equated to the number of cups or disks in the launcher and the associated number of pigs that would contain that amount of cups or disks. The number of pigs left in the barrel can then be inferred mathematically with reasonable certainty. This allows the tracking of pigs leaving the barrel to be very simply observed and confirmed.

BRIEF DESCRIPTION OF THE DRAWINGS

FIG. 2 is an enlarged view of sectioned area 2 of FIG. 1. The distribution grid includes a plurality of ports, some of which are aligned vertically and others of which are aligned off-vertical in the direction of launch (or, in the case of a receiver, in the direction of the incoming pig). The inclined ports serve to apply an axial force to move the pig forward. Other ports lift the pig to reduce or omit friction. Ports can be formed in many different geometrics to better interact with the pig surface area.

FIG. 3 is a view taken along section line 3-3 of FIG. 1. The distribution grid creates a cavity or chamber between it and the bottom of the launcher barrel. The differential pressure forms the lifting mechanism to reduce friction and move the pig.

ELEMENTS AND NUMBERING USED IN THE DRAWINGS AND DETAILED DESCRIPTION

10 Fluidic pig launcher
20 Distribution grid
21 Perforated matrix
23 Insert or sheet (stitch-welded or pull-out panel)
25 Edges
27 Fluid cavity or chamber
29 Launch section, segment, cell, or zone
30 Fluidic ports
31 Vertical ports
33 Oblique-angled or inclined ports
49 Launch pins
B Barrel
C Cups or discs (sealing elements)
F Floor portion
L Launcher/receiver
R Reducer or reduced area position
V Valve

DETAILED DESCRIPTION OF THE PREFERRED EMBODIMENTS

Figure 1:
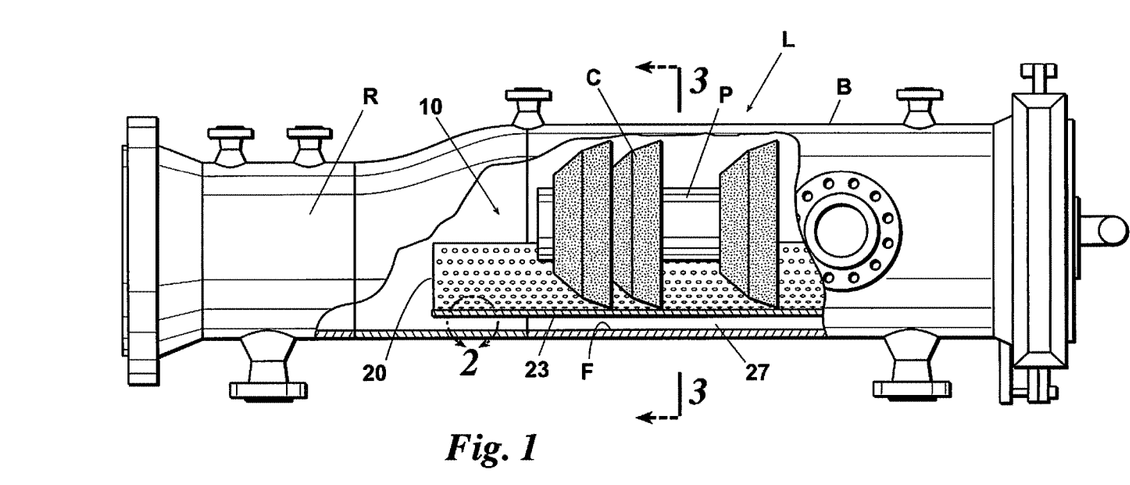
FIG. 1 is a front elevation view of a preferred embodiment of a fluidic pig launch system equipped with a launcher barrel having a distribution grid that positions the fluid entering the barrel in such a way that the fluid immediately interacts with a pig or diagnostic tool lined up in the barrel to lift the pig or tool and negate the effects of friction.
Figure 4:
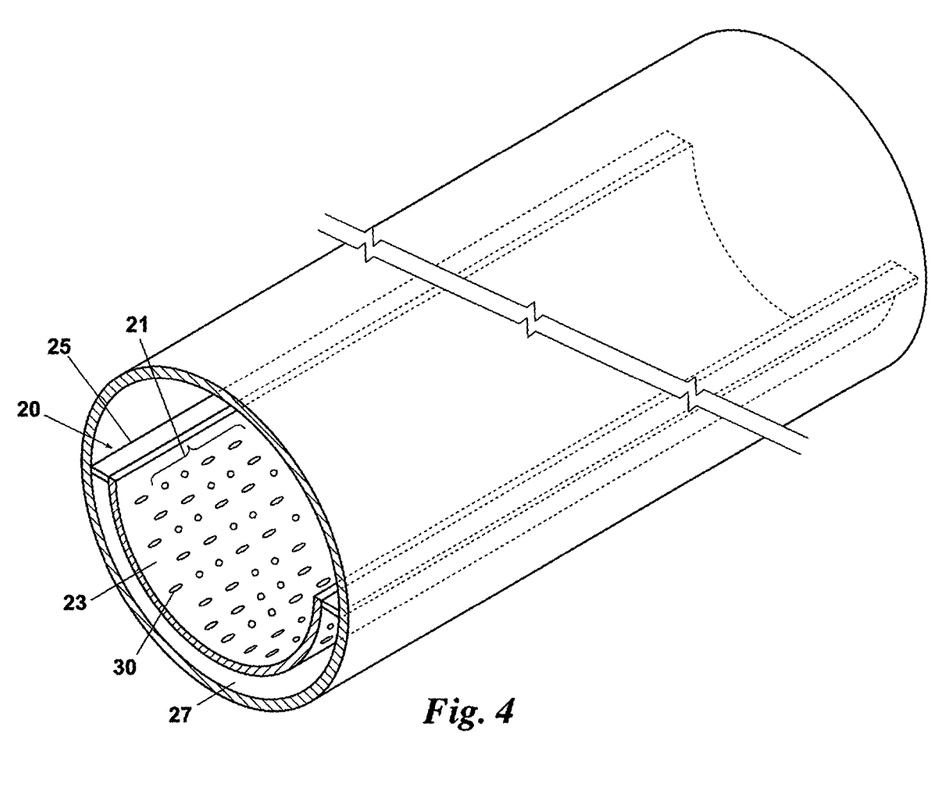
FIG. 4 is an isometric view of the launcher barrel equipped with a preferred embodiment of the distribution grid.
Figure 5:
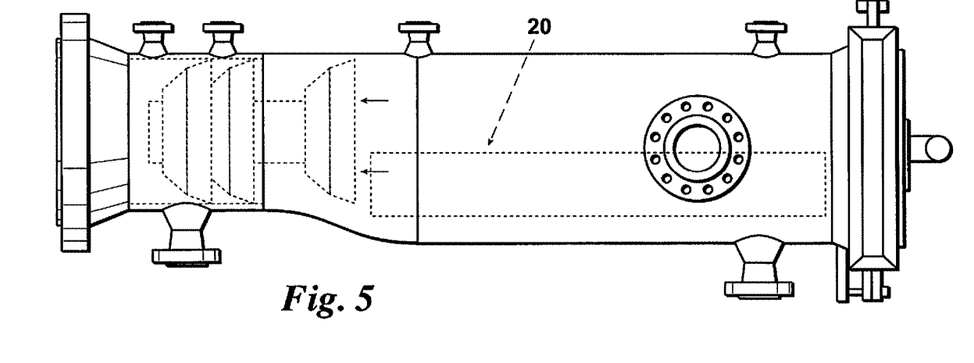
FIG. 5 is a front elevation view of a pig launcher equipped with a distribution grid and rotated 180° from the orientation of the pig launcher of FIG. 1. Angling this launcher downward—which the distribution grid eliminates the need for—can result in puddles of fluid forming between the drain and the reducer portion of the launcher.
Figures 6, 8:
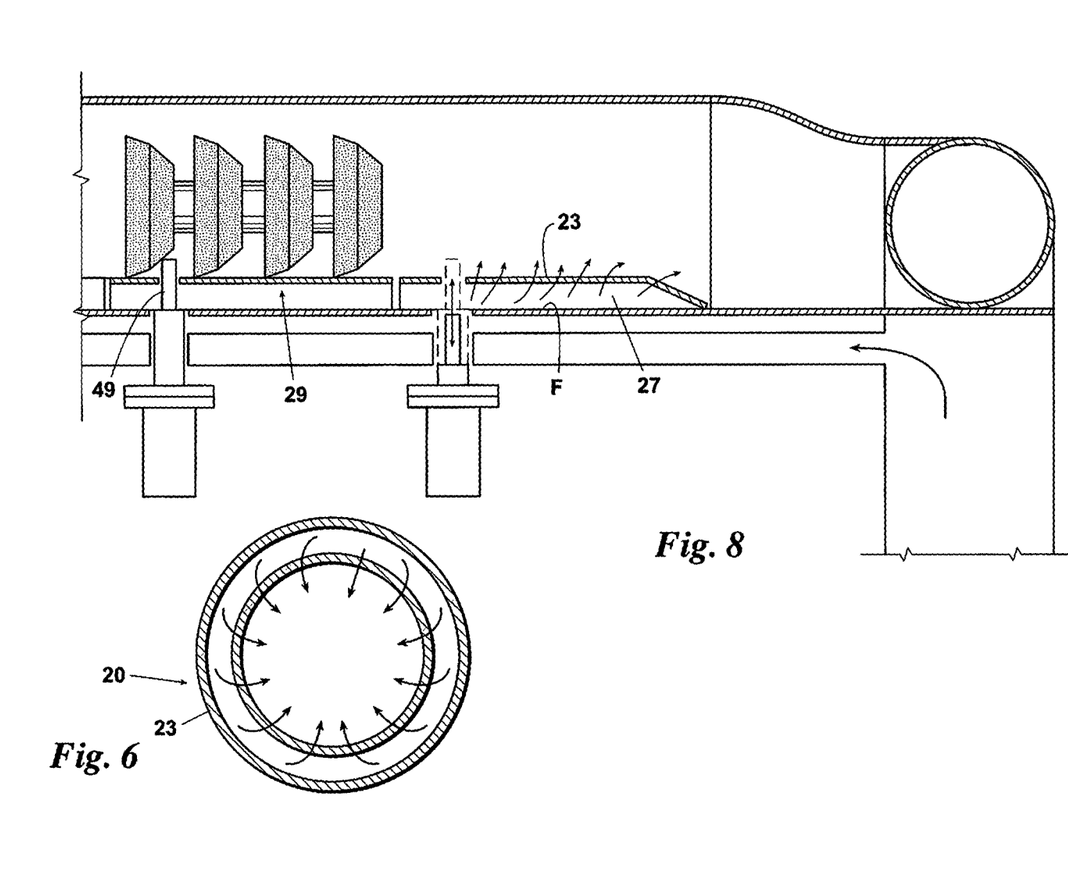
FIG. 6 is an alternate embodiment of the distribution grid that completely envelopes or surrounds the diameter of the pig to be launched.
FIG. 8 is a front elevation view of another preferred embodiment of the fluidic pig launch system. Small positioning pins are used in each zone of the distribution grid to provide a positive mechanical locking device.

Referring to the drawings, a preferred embodiment of a fluidic pig launcher 10 made according to this invention distributes a portion of the fluid medium entering the barrel "B" of the launcher 10 into a fluid distribution grid 20. The distribution grid 20 is arranged as a perforated matrix 21 positioned under the pig or tool "P" and above a floor portion "F" of the launcher 10. In a preferred embodiment, the perforated matrix 21 is a perforated insert or sheet 23 that slips into the barrel of the launcher 10 to form a semi-circular distribution grid 20 coaxial to the centerline of the barrel. Other arrangements of sheet 23 can be used, including but not limited to one that completely envelopes or surrounds the diameter of the pig. The edges 25 of the sheet 23 can be stitch-welded to the main body of the barrel such that it becomes a part of the original weldment or it can be arranged as a panel that pulls out of the launcher body and allows pigs to be positioned onto the panel.

Figure 7:
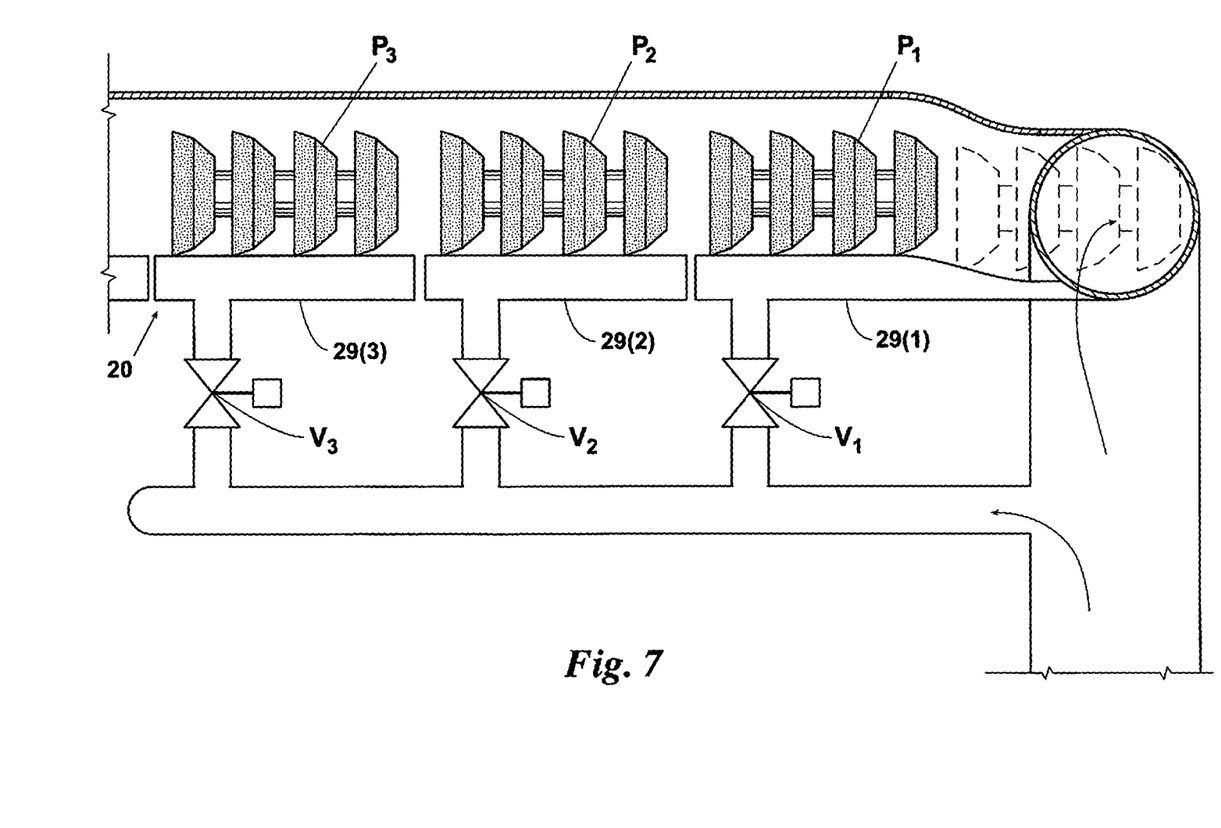
FIG. 7 is schematic of another preferred embodiment of the fluidic pig launch system equipped with a distribution grid sectioned into cells or zones that correspond with the length of the grid and can be individually energized. Energizing the zones in sequence allows pigs to be launched sequentially without the need for control pins or hydraulic power units. Pigs can be launched manually or automatically by simply energizing the appropriate zone while maintaining flow through a previously energized zone.

The distribution grid 20 can be divided into separate launch segments, sections, cells, or zones 29 that correspond with lengths of the grid 20 and fed by valves to energize each zone 29. Energizing the zones 29 in sequence allows pigs to be launched sequentially without the need for control pins or hydraulic power units. Pigs can be launched manually or automatically by simply energizing the appropriate zone.

For example, when needed valve V1 would open to provide flow into zone 29(1) to lift and move pig P1 into the launch position. Once in the launch position, valve V1 remains open to continue flow through zone 29(1). When pig P2 is required to launch, valve V2 opens in conjunction with V1 to move provide flow through zone 29(2) and move pig P2 into the launch position. This process continues N times to match the number of pigs contained in the launcher, always leaving flow through the zones 29 where pigs were already launched. This flow also helps to clean the ports 30 in those zones 29 and break-up any hydrates attempting to form.

Launch pins 49 can be provided where a positive mechanical locking device is desired. This embodiment eliminates the needs for large, costly valves. The pin 49 is arranged to provide a small amount of bypass flow and can be a top, side, or bottom mount, with the bottom mount being preferred. When the pin 49 is in the retracted position, the distribution zone 29 gains full flow to build the appropriate design differential pressure, lifting the pig and moving it forward into the launch position.

Existing pig launchers can have a secondary membrane located below the barrel to allow for retrofitting of already installed equipment. This retrofit arrangement ensures that an addition to the existing weldment can be made to make use of the fluidic launching approach.

Figure 2:
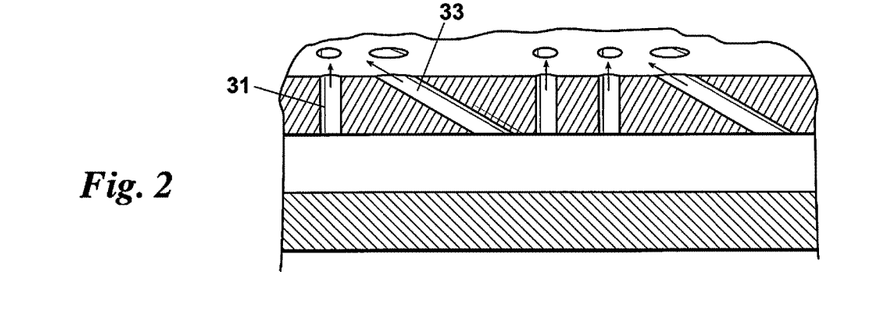

The distribution grid 20 includes fluidic ports 30 used for lifting the pig, The ports 30 preferably range in angle from 0 degrees to 70 degrees off vertical, performing a multiple approach to aggressively move the pig. Vertical ports 31—perpendicular to a longitudinal centerline of the barrel—lift the pigs to minimize friction, while angled ports 33—i.e. oblique to the longitudinal centerline of the barrel—serve to move the pig forward into the launch position (or, conversely, slow the pig in the receive position). Depending on the size of the pigging tools being launched, the ports 30 can range in diameter from approximately 0.032 inches (0.8128 mm) in diameter to more than 1 inch (25.4 mm) in diameter. Variations of port diameters can also be used depending on the application and the work needed to be accomplished.

The ports 30 are aligned to best interact with the available surface area of the pig P being launched. Preferably, the ports 30 are aligned in rows, with the number and location of rows and ports 30 within the rows a function of pig size and weight. Each port 30 represents a fraction of the lift and each is designed appropriately for the application needs. Pressure changes with the launch of individual pigs allow the accounting for each pig as it leaves the launcher.

A pull-out panel design of the insert or sheet 23 adds a significant amount of safety because it allows a technician to load pigs without ever having to reach inside the launcher barrel or stand directly in front of the closure door. Once the pigs are loaded, the panel can be slid back into position and the closure door closed. This is also especially useful when large or heavy weighted pigs are loaded, such as but not limited to in-line inspection ("ILI") tools. Additionally, a pull-out panel design can permit interchangeability of distribution grid designs.

Regardless of whether the sheet 23 is stitch-welded as part of the original weldment, bolted into place, or arranged as a pull-out panel to the barrel, even if the edges 25 of the sheet 23 leak somewhat, the overall flow potential is primarily through the perforated matrix 21 of the sheet 23. The perforated matrix 21 includes the plurality of ports 30 that create fluid jets within the barrel designed to impinge and interact upon the cups or disks "C" of the pig. The size, spacing, angle, pressure, and number of ports 30 can be arranged to create different effects on the launch.

Figure 3:
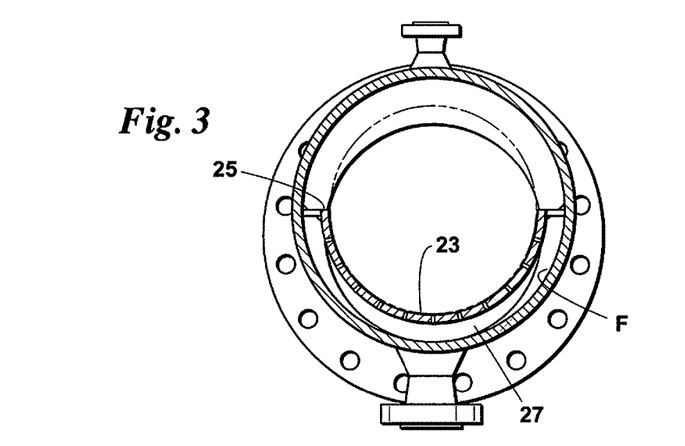

The fluid jets provided by the ports 30 interact with the surface area of the cups or disks of the pig to create lift or movement. When the pig is at rest, the cups or disks of each pig block a large number of fluid ports 30. The area of each jet coupled with buoyancy and the impact or interaction point on the cups or disks creates a lift point for the pig to be raised fluidically above the floor of the barrel. Once the pig is vertically elevated above the floor of the barrel friction is reduced, if not completely eliminated with the barrel, and the pig can easily be moved axially into the launch position, at which point the fluid entering the downstream Tee sweeps the pig toward a reduced cross-section area "R" or position of the barrel and pressure continues to build up behind the pig.

As each pig seats into the reduced position, the main stream of fluid (a liquid, gas, or some combination of the two) entering the launcher barrel accumulates to form increased pressure for launching. When the pressure at this point reaches the appropriate total pressure, the pig is launched into the pipe line. The pressure is increased in the reduced position by the primary fluid flow entering the barrel from the downstream Tee section. A smaller fraction of this fluid is diverted from the main stream and this slip stream is delivered to a cavity or chamber 27 defined by the sheet and the opposing floor portion of the barrel. Primary lift and positioning is formed by the slip stream, and the final launch pressure is produced by the main or primary fluid stream once the pig passes the Tee and is moved into the reduced position for launching.

Based on the back pressure at a given flow rate (before the pigs lift) the number of blocked ports and area covering a range of (or containing) the blocked ports can be calculated, with the area easily equated to the number of cups or disks in the launcher and the associated number of pigs that would contain that amount of cups or disks. The number of pigs left in the barrel can then be inferred mathematically with reasonable certainty. This allows the tracking of pigs leaving the barrel to be very simply observed and confirmed.

To ensure the pig is moved forward into the launch position, at least some of the ports 30 of the perforated matrix 23 should be angled in the forward direction (that is, pointing opposite the closure door of the barrel). As the pig is lifted vertically, and becomes effectively weightless to the system, the inclined ports 33 can easily move the pig forward to interact with the fluid entering at the Tee. The system uses only the energy of the fluid to lift, position, and launch the pig. The ports 30 can be angled in a range of 0 degrees off vertical to greater than 70 degrees off vertical toward the launch direction, enhancing the speed at which the pig moves into the reduced pipe position for launching. Conversely, when used in a receiver, the inclined ports 33 are angled toward the receive direction.

Unlike a conventional slip sheet—which is arranged for low pressure, non-pipeline applications and uses a gas matrix to move excessively large pieces of equipment in a vertical direction only—the sheet being used here is arranged for a high pressure, pipeline application to move a pig axially and vertically. Because the pressure required can be significant (e.g. in a range of about 35 to 7,000 psig) depending on the application and the weight of the pig one is attempting to move, the jet exiting each port 30 is still expanding, thereby creating the pressure interaction and momentum (energy) to lift the pig. The jet not only lifts the pig to minimize or negate friction, it also pushes the pig forward because of its angular orientation.

The fluidic pig launcher 10 provides a number of benefits. First, no downward incline of the barrel is needed (gravity) for the pig to move axially when at least a portion of the jets are angled in a forward direction. This reduces cost because the launcher requires less steel and therefore less welding and assembly time and lower shipping costs. Second, the system is simple relative to mechanical screw-type systems which require drives and seals to maintain the fluids contained inside the barrel. Because of its simplicity, the system is more easily integrated into existing launchers (and receivers) and is more reliable. Third, ice, paraffin, and other debris that can impede or prevent launching can be dislodged by the jets, ensuring the launcher remains active and useful. Fourth, the system can help determine if a given pig has launched and how many pigs remain in the barrel. Fifth, the system adds a significant amount of safety when designed as a pull-out panel because a technician never has to reach inside the barrel or stand directly in front of the closure door when loading the launcher. Sixth, when used in both the launcher and receiver, the system becomes reversible with the receiver, once full of pigs, becoming the launcher and the launcher, now empty of pigs, becoming the receiver. Bi-directional pigs and an appropriately designed valve control scheme is also required for this reversible system.

The following claims define the invention and include the full range of equivalents to which the recited elements are entitled.

What is claimed:

1. A method of launching a pipeline pig, the method comprising:
    positioning a pipeline pig in a launch position over a fluid distribution grid located between the pipeline pig and a barrel floor of a first launcher/receiver, the pipeline pig including at least two sealing elements; the fluid distribution grid configured as a perforated matrix containing a plurality of ports arranged to form jets that discharge fluid toward an opposing surface area of said sealing elements resting on and blocking ports of the plurality when in the launch position;
    filling a fluid chamber located between the barrel floor and the fluid distribution grid;
    lifting the pipeline pig from the fluid distribution rid when in the launch position by discharging through the plurality of ports at least a portion of a fluid which enters the fluid chamber, the fluid acting on the opposing surface area of said sealing elements; and launching the pipeline pig, when lifted, in a direction opposite that of a closure door of the first launcher/receiver.

2. A method according to claim 1 further comprising calculating a number of blocked ports and area of the fluid distribution grid covering a range of the blocked ports.

3. A method according to claim 2 further comprising:

equating the area to a number of sealing elements in the launcher/receiver; and inferring from the number of sealing elements the number of pigs remaining in the launcher/receiver.

4. A method according to claim 1 wherein the fluid distribution grid is divided into at least two separate zones, the method further comprising preventing the fluid from entering one of the zones.

5. A method according to claim 4 further comprising allowing fluid to enter the zone where the fluid was prevented from entering.

6. A method according to claim 1 wherein a predetermined number of ports of the plurality of ports are inclined relative to vertical in a direction opposite the closure door.

7. A method according to claim 1, the pipeline pig including a diagnostic tool.

8. A method according to claim 6, wherein fluid exiting the inclined ports move the pig in the direction opposite the closure door.

9. A method according to claim 1, the fluid distribution grid being shaped complementary to an opposing portion of the barrel floor.

\* \* \* \* \*